United States Patent [19]

Watt et al.

[11] 4,113,895

[45] Sep. 12, 1978

[54] METHOD FOR PRODUCING MULTILAYERED COATED SUBSTRATE

[75] Inventors: William R. Watt, Princeton Junction, N.J.; Edmund G. Astolfi, Greenwich, Conn.; Jay K. Laufer, Huntington Sta., N.Y.

[73] Assignee: American Can Company, Greenwich, Conn.

[21] Appl. No.: 743,133

[22] Filed: Nov. 19, 1976

[51] Int. Cl.$^2$ .............................................. B05D 3/06
[52] U.S. Cl. .................................. 427/44; 204/159.11; 204/159.16; 204/159.23; 427/54; 427/407 A; 427/407 C; 427/410; 427/411
[58] Field of Search ................. 427/44, 53, 54, 407 R, 427/409, 410, 411; 204/159.11, 159.12, 159.13, 159.14, 159.15, 159.16, 159.17, 159.18, 159.19, 159.20, 159.21, 159.22, 159.23, 159.24; 428/413, 416, 418, 461

[56] References Cited

U.S. PATENT DOCUMENTS

| | | | |
|---|---|---|---|
| 3,156,580 | 11/1964 | Howard | 427/410 |
| 3,552,986 | 1/1971 | Bassemir et al. | 204/159.23 |
| 3,715,293 | 2/1973 | Sandner et al. | 204/159.15 |
| 3,936,557 | 2/1976 | Watt | 204/159.11 |
| 3,960,073 | 6/1976 | Rush | 427/409 |

FOREIGN PATENT DOCUMENTS

674,157  11/1963  Canada ..................................... 427/410

*Primary Examiner*—John H. Newsome
*Attorney, Agent, or Firm*—Robert P. Auber; Ira S. Dorman; Ernestine C. Bartlett

[57] ABSTRACT

Printed and varnished surfaces are provided by depositing a base film or printing on a substrate and depositing, wet-on-wet, a protective varnish or top coat after which the multilayers are exposed to an energy source, preferably to electromagnetic radiation, to simultaneously cure the varnish and ink on said substrate.

15 Claims, No Drawings

METHOD FOR PRODUCING MULTILAYERED COATED SUBSTRATE

BACKGROUND OF THE INVENTION

Multilayer coating systems are well known in the art. For example in the metal container industry, it is conventional to print or decorate an article after which it is coated with a transparent varnish or film which serves to protect the printing and heighten the aesthetic characteristics of the container. These systems have long been applied separately and baked in ovens to remove volatile solvents and thereby dry the respective layers prior to overcoating with an additional layer which is likewise heated or baked to evaporate the solvent. Evaporation and baking consume large quantities of energy and add pollutants to the atmosphere. For this reason, in an age of conservation of energy consumption and pollution prevention, increasing emphasis is being directed to the industry to energy saving and pollution free techniques such as curing of photopolymerizable coatings, the advantages over prior procedures being readily apparent.

More recently, a broad spectrum of photocurable coatings have been developed wherein light-sensitive catalyst precursors are incorporated in polymerizable materials and act to initiate curing via crosslinking or polymerization upon exposure to irradiation. Many prior art processes disclose radiation curing of various polymers, all of which have advantages and disadvantages peculiar to the particular system. Attempts to utilize the best features of different systems by employing inks from one system in combination with varnishes from another are frequently thwarted by unexpected interactions which result in slow cure. Some inks and varnishes which independently have have desirable properties cannot be used in combination with each other. This results in the use of less desirable materials, as for example, volatile materials, which defeats the anti-polluting goal of radiation curing. The limitations of combining inks and varnishes from various systems have contributed to the slow commercial acceptance of radiation curing.

SUMMARY OF THE INVENTION

The present invention provides a method for producing multilayered coatings using combinations of radiation curable inks and varnishes which are non-polluting, are applied wet-on-wet, and are rapidly cured to provide varnished, printed substrates of acceptable gloss and aesthetic properties as well as acceptable rheological properties.

DESCRIPTION OF THE INVENTION

This invention relates to a method of providing a multicoated substrate which comprises the steps of (1) applying to a substrate a layer of a fluid radiation-curable ink composition having as essential components at least one compound polymerizable to higher molecular weight through the action of a catalyst and a latent catalyst precursor which initiates polymerization of the material and/or crosslinking upon exposure to radiation; (2) without drying or actively effecting curing of said first layer, applying to said first layer a fluid radiation-curable varnish composition having as essential components at least one compound polymerizable to higher molecular weight through the action of a catalyst and a latent catalyst precursor which initiates polymerization and/or crosslinking upon exposure to radiation; said first layer composition being devoid of components that substantially inhibit or retard the action of the catalyst precursor in said second layer; (3) exposing the coated substrate to irradiation to produce a hardened, multilayered coated substrate.

It has been discovered that multicoated, e.g. printed and varnished surfaces, may be prepared which require only one radiation exposure step. Utilizing the process offers a means of obtaining coatings having excellent aesthetic properties and a means for combining the desirable properties of two different types of coatings. Additionally, the system offers substantial savings in time and energy consumption since the operative steps required by conventional procedures wherein at least two exposure steps or at least drying between exposures are significantly reduced.

As used in this application, the term "inks" is meant to include finely divided pigment and/or particulate filler in a film-forming photopolymerizable resin and catalyst precursor comprising, binder and the binder without pigment or particulate filler. Thus, the binder which is ultimately converted to a film can be all or virtually all that is used to form the film, or it can be a vehicle for pigment or particulate filler material. The term "varnish" is meant to include top-coat compositions which may also include pigment or filler in a film-forming photopolymerizable resin and catalyst precursor comprising binder and the binder without pigment or filler. However, since the photopolymerization, curing and/or crosslinking of both the ink and varnish layers is accomplished herein simultaneously in a single exposure step, it is essential that the varnish composition not contain pigments or fillers in such amounts or of such character that they absorb radiation or mask the ink layer to the extent that hardening thereof cannot take place. Optimum results are obtained when the varnish is substantially transparent, i.e. when it is substantially free of pigment and/or filler.

PHOTOPOLYMERIZABLE INKS AND VARNISHES

Any resin polymerizable or cross-linkable to higher molecular weights through the action of a catalyst precursor which is activatable upon irradiation to release an active catalyst effective to initiate polymerization or crosslinking may be employed herein. Radiation curable epoxy and acrylic resin compositions are especially preferred herein as the binder in either or both of the ink and varnish layers. The invention thus contemplates photocurable epoxy varnish-epoxy ink, epoxy varnish-acrylic ink, acrylic varnish-acrylic ink, acrylic varnish-epoxy ink systems as well as "no var" systems wherein the photocurable composition, devoid of catalyst, is applied as the first layer and a top layer of a suitable photoactivatable catalyst is applied.

(A) Epoxy Inks and Varnishes

Photopolymerizable compositions containing epoxy resin binders and latent photoactivatable catalysts therefor are well known in the art. A variety of resins and catalyst precursors may be used. Illustrative of suitable classes of epoxides are monomeric and prepolymeric materials which may be mono- and polyglycidyl ethers of bisphenol A (DGEBA) resins including those available commercially under the EPON, Araldite, Epi-Rez, DER, etc. trademarks; polyepoxidized phenol or cresol novolaks, including those available commercially under the DEN, ECN, etc. trademarks; i.e., polyglycidyl ethers of phenol-formaldehyde novolac or polyglycidyl ethers of cresol-formaldehyde novolacs; epoxides of cycloalkyl hydrocarbons, for example dicyclopentadiene dioxide or vinylcyclohexene dioxide; epoxides of cycloalkyl ethers, for example bis(2,3-epoxycyclopentyl) ether; epoxides of cycloalkyl esters, for example (3,4-epoxycyclohexyl) methyl 3,4-epoxycyclohexane carboxylate or bis[(3,4-epoxy-6-methylcyclohexyl) methyl] adipate; mono and polyglycidyl ethers of polyhydric alcohols, for example diglycidyl ether of 1,4-butanediol, diethylene glycol diglycidyl ether, 1,2,3-tris(2,3-epoxypropoxy) propane; monoepoxides such as propylyene oxide, ethylene oxide, allyl glycidyl ether, butyl glycidyl ether, glycidyl phenyl ether; epoxy esters such as allyl glycidyl ether-glycidyl methacrylate copolymer, polyolefin epoxides, for example, epoxidized polyethylene or epoxidized butadiene, etc. Other specific examples of suitable epoxides, may be found in Handbook of Epoxy Resins, Lee and Neville, McGraw-Hill, (1967), Chapters 2, 3, and 4 and their appendices. Particularly preferred are essentially solventless, rapidly curable liquid epoxide blends as disclosed in U.S. Pat. No. 3,794,576 issued Feb. 26, 1974 to William R. Watt and commonly assigned herewith as well as epoxides as disclosed in U.S. Pat. No. 3,708,296 dated Jan. 2, 1973 to Sheldon Schlesinger; U.S. Pat. No. 3,949,143 dated Apr. 6, 1976 to Sheldon Schlesinger; and U.S. Pat. No. 3,895,954 issued July 22, 1975 to Jerome Roteman; all commonly assigned herewith. Mixtures of such epoxides may also be employed.

Suitable initiators for the epoxy resin compositions defined above may be any compound or mixtures thereof which decompose under the action of suitable irradiation to release an active catalyst effective to initiate polymerization or cross-linking of the epoxide material. Suitable compounds include any of a broad class of complex salts designated as onium compounds which decompose upon irradiation to release a Lewis Acid which effectively initiates polymerization. Such compounds may be characterized as essentially containing the ions $[R^1_aR^2_bR^3_cR^4_dZ]_m^+$ $[MX_{n+m}]^{-m}$ wherein the cation is an onium group wherein Z is N≡N, N, S, Se, Te, P, As, Sb, Bi, O, halogen such as I, Br, Cl; $R^1$, $R^2$, $R^3$ and $R^4$ are organic radicals which may be the same or different, $a$, $b$, $c$ and $d$ are integers from 0 to 3, the sum of $a$, $b$, $c$ and $d$ being equal to the valence of Z; M is a metal or metalloid central atom of the complex halogenide and is B, P, As, Sb, Fe, Sn, Bi, Al, Ga, In, Ti, Zn, Sc, V, Cr, Mn, Co, etc. X is halogen, $m$ is the net charge on the complex halogenide ion and the number of onium groups present and $n$ is the number of halogen atoms in the complex halogenide ion.

Such catalyst precursors are well known in the art. For example, the compounds wherein Z is N≡N — are disclosed in U.S. Pat. Nos. 3,708,296; 3,949,143; 3,794,576, etc. referred to hereinabove. Other onium catalyst precursors are disclosed in Belgian Pat. Nos. 828,841 and 828,669; French Pat. No. 2,270,269; Swedish Pat. No. 7,504,888; etc. The diazonium compounds may be prepared for example as described in said U.S. Pat. Nos. 3,708,296, 3,949,143, etc. Compounds wherein Z is S, Se or Te can be made by the procedure shown in J. Knapczyk et al, J.A.C.S., 91, 145, (1969); A. L. Maycock et al. J. Organic Chemistry, 35, No. 8,2532 (1970); Goethals et al, Bul. Soc. Chim. Belg., 73 546 (1964); H. M. Leicester et al, J.A.C.S., 51, 3587 (1929), etc. Representative onium salts wherein Z is P, N, As, Sb and Bi can be made by the procedures described by J. Goerdeler, Methoden der Organishen Chimie, 11/12, 591–640 (1958) and K. Sasse, ibid., 12/1, 79–112 (1963). Representative onium salts wherein Z is halogen may be prepared by procedures described by O. A. Ptitsyna et al, Dokl. Adad. Nauk., SSSR, 163, 383 (1965); M. Drexler et al, J.A.C.S., 75, 2705 (1953), etc.

Illustrative of other catalyst precursors which may also be used to initiate polymerization of the epoxides are organohalogen compounds such as iodoform, α,α',-dibromo-p-xylene; bromoform; carbon tetrabromide; hexachloro-p-xylene and other catalysts described in U.S. Pat. No. 3,895,954; bis(perfluoroalkyl sulfonyl) methane metal salts and diazonium salts of such sulfonyl methanes as described in U.S. Pat. No. 3,586,616 dated June 22, 1971; German Pat. No. 2,419,274 dated Apr. 22, 1974, etc. Especially preferred herein are photopolymerizable epoxy compositions wherein the epoxide is a liquid blend of epoxy resins, illustrated further hereinbelow, and the catalyst precursor is a diazonium, sulfonium or iodonium salt of a complex halide. A typical formulation of a photocurable epoxy varnish suitable for use herein may be illustrated by a composition comprising: 75 parts of a cycloalkyl epoxy ester (CY 179), 25 parts of 1,4-butanediol diglycidyl ether and 3 parts of a photoinitiator therefor such as a complex diazonium, sulfonium, iodonium hexafluorophosphate salt, etc. with minor amounts, if desired, of a stabilizer such as vinyl pyrrolidone.

(B) Acrylic Inks and Varnishes

Photocurable acrylic compositions containing acrylic resins and initiators therefor are also well known in the art. Such compositions in general contain a major amount of monomers having ethylenic unsaturation, modifiers therefor if desired, a photoactivatable catalyst precursor and, in many instances, a nitrogen containing compound, e.g. an amine, as an accelerator for the catalyst precursor. Any of such systems known in the art may be utilized in the present invention. The term "acrylic" as used herein means ethylenically unsaturated compounds normally curable by free-radical induced polymerization. The preferred compositions include acrylic acid, alkacrylic acids, e.g. methacrylic acid and derivatives thereof. Illustrative of useful components are polymeric or monomeric materials or mixtures thereof containing polymerizable vinyl, acrylic, allylic, fumaric, maleic and the like groups having ethylenic unsaturated functionality. The monomers may be aliphatic, aromatic, cycloaliphatic, etc. including hydrocarbons having up to about 18 carbon atoms. Suitable monomers include a variety of acrylates such as hydroxyethylacrylate, cyclohexyl acrylate, hydroxyethyl methacrylate, benzyl acrylate, 2-ethylhexyl acrylate, phenyloxyethyl acrylate, alkoxyacrylates, etc. Suitable derivatives of acrylic acid include acrylonitrile, methacrylonitrile, reactive polymers such as acrylated epoxides, polyesters, acrylics, urethanes, etc. as well as oligomers with trimethylolpropane diacrylate and triacrylate, neopentyl glycol diacrylates, butanediol diacrylate, ethylene glycol dimethacrylate, ethylene glycol diacrylate, 1,6-hexanediol diacrylate, pentaerythritol triacrylate, etc. Additionally, compounds derived from unsaturated polyesters with vinyl monomers such as styrene and its derivatives and the acrylyl and methacrylyl compounds and derivatives thereof are also suitable. Additionally, such acrylic compounds may be modified with urethanes, e.g. reaction products of organo isocyanates and suitable polyhydric alcohols well known in the art. Other suitable acrylic compounds will be readily recognized by those skilled in the art, the only requirement being the presence in said compound of a polymerizable ethylenically unsaturated group. p Acrylic inks suitable for use herein comprise high molecular weight resins such as urethanes, epoxides or polyesters having pendant or terminal acrylate groups; polyfunctional acrylic cross linkers such as trimethylolpropane or pentaerythritol triacrylate; low-viscosity acrylic monomers such as hydroxypropyl acrylate or n-hexyl acrylate; free-radical inhibitors such as p-benzoquinone; a photoinitiator or catalyst precursor that decomposes to initiate polymerization as well as other additives such as pigments, fillers, flow-control agents, etc. A representative formulation may be represented by the following:

Vehicle 10 to 40 parts (preferably 20 to 30 parts) of resin ester, e.g. a reaction product of o-benzoyl benzoic acid and epoxidized linseed oil (M&T Chemical's Resin 8005)

10 to 60 parts (preferably 20 to 30 parts) of acrylated resin, e.g. a bisphenol A type acrylated epoxy resin (Dow Resin 8008.04)

20 to 60 parts (preferably 30 to 40 parts) of a reactive modifier, e.g. pentaerythritol triacrylate 5 to 12 parts (preferably 8 to 10 parts) of a photoinitiator, e.g. α,α-diethoxy-acetophenone 0.05 to 0.2 parts (preferably 0.1 to 0.15 parts) of a free-radical inhibitor, e.g. p-benzoquinone.

Any of the photoinitiators commonly used to initiate photopolymerization of such ethylenically unsaturated monomers may be employed herein. Examples of such initiators include aromatic carbonyl compounds, aromatic amine carbonyl compounds, aromatic ketones and aldehydes, etc. as illustrated by acetophenone, propriophenone, benzophenone, benzaldehyde, methoxyacetophenone, α,α-diethoxyacetophenone, benzoin ethers and esters, benzil, furil, thioxanthone, 2-chlorothiozanthone, etc. Additional examples of suitable monomers, initiators and accelerators are disclosed in U.S. Pat. No. 3,840,448 dated Oct. 8, 1974.

Amine accelerators are commonly added to enhance the curing rate of radiation-polymerizable acrylic compounds. Such compounds such as triethanolamine and methyl diethanolamine are commonly used. In the instant method, multiple layers of curable compositions are cured and/or hardened simultaneously. For example, in the preferred embodiment, acrylic inks are applied to a substrate and overcoated with an epoxy varnish. It has been discovered that the amine accelerators commonly used in acrylic inks tend to react with the Lewis acid liberated from the catalyst precursor in the epoxy varnish layer upon exposure to radiation resulting in either a failure to cure or a cure rate that is too slow to be acceptable for most commercial high-speed coating applications. (For the purpose of this invention, cure rate is rated satisfactory when after the multilayers are applied to a substrate the top coat is hardened to the touch, and the underlayer is immobilized after exposure to a 200 watt per inch lamp while the substrate moves on a conveyor or other means at a rate of at least 100 feet per minute.) Accordingly, it is essential that the acrylic inks be either free of amines and/or other components that retard or inhibit the cure rate or that such components, if present, be present in amounts insufficient to inhibit curing below this rate. The preferred acrylic ink compositions will be amine-free.

Pigments, fillers and waxes employed in the varnishes and inks may vary as desired, the only requirement being that they not substantially retard the curing of the top coat (varnish) below the acceptable rate defined hereinabove. The term "pigment" as used herein is meant to include colored organic and inorganic compounds which are normally used to impart color as well as organic dyes. Most of such additives are commercially available. Suitable pigments include rhodamines, rubines, lithols, red lakes, phthalo blues and greens, carbon blacks, alkali blues, methyl violets, benzidine yellows, chrome yellows, carbazole violets, titanium dioxide whites, Watchtung reds, para and other diazo reds, etc. Other illustrations of suitable pigments include inorganic pigments, e.g. titanium dioxide, zinc oxides, metallic flakes, powders such as aluminum powder, bronze powder and the like; organic pigments such as Phthalocyanine green, Phthalocyanine blue, Permanent red 2B, Lithol red, Lithol rubine, Toluidine red, Hansa yellow, Toluidine yellow, oil soluble dyes, etc. Fillers and waxes may include magnesium carbonate, aluminum carbonate, polyethylenes, polytetrafluoroethylenes, fatty acid ester waxes, etc., and other well known compounds conventionally employed in inks and varnishes.

In general, the proportions of the components of the varnish and ink compositions will vary within the ranges of about 70 to 80% vehicle to about 30 to 20% pigment. The amounts of photoinitiator to polymerizable monomer or prepolymer will be that amount sufficient to initiate polymerization. With the epoxy systems, the initiator is usually present in amounts ranging from 0.5% to about 5% based on the weight of the epoxide material, about 1% or less being amply effective. With the acrylic systems, initiator amounts will range from about 0.1 to about 10% based on the weight of the acrylic material.

The method of the invention is especially suitable for use in decorating metal products such as beer and beverage containers of aluminum and steel including tinplate and tin-free steel (TFS). It may also be employed to decorate or coat paper, plastic, glass, ceramics and other substrates.

The coatings may be applied to the substrate by any of conventional procedures including roller coating, direct gravure, letter press, offset gravure, dry offset and flexography, the one requirement being that it be a wet-on-wet application, i.e. drying of layers between applications is to be avoided. The coatings are cured by irradiation. The source of the radiation may be any suitable source well known in the art including the ultraviolet electromagnetic radiation produced from a mercury, xenon or carbon arc lamp or the electron beam produced in a suitably evacuated cathode ray gun. The only limitation placed on the radiation used is that it must have an energy level sufficient to activate the latent catalyst precursors in the top-coat or varnish layer and first coat or ink layer.

The respective layer thicknesses may be varied as desired. Satisfactory results have been obtained when employing ink layer thicknesses ranging from about 0.05 to about 1 mil with varnish layer thicknesses ranging from about 0.05 to about 1 mil and preferably from about 0.1 to 0.5 mil. The following examples will serve to further illustrate the invention:

EXAMPLE 1

A. An acrylic ink comprising a pigment, M&T Chemicals Resin 8005 (reaction product of o-benzoyl benzoic acid and epoxidized linseed oil), Dow Resin 8008.04 acrylated epoxy resin and pentaerythritol triacrylate, and without photoinitiator, was divided into two equal parts. The two parts were separately photoactivated by adding ten percent benzophenone and two percent Michler's ketone to one part and ten percent diethoxyacetophenone to the other part. The two photoactivated inks were applied to aluminum sheets employing a hand-operated proof press. A low viscosity light-curable epoxy varnish comprising CY179 cycloalkyl epoxy ester, 1,4-butanediol diglycidyl ether and p-methoxybenzene diazonium hexafluorophosphate was applied over the wet ink. The coated aluminum sheets were placed on a variable-speed conveyor and passed under three 200 watt/inch mercury arc lamps. The varnish applied over the ink containing diethoxyacetophenone cured to a non-tacky finish at a conveyor speed of 200 feet per minute while that applied over the ink containing diethoxyacetophenone and Michler's ketone, failed to cure.

B. A white acrylic ink, (M&T Chemicals, 65-68-A) containing 50% titanium dioxide was divided into three equal parts and photoactivated with the photoinitiators listed hereinbelow. The inks were applied to aluminum sheets and immediately top coated with the U.V.-curable epoxy varnish in part A above. The decorated varnished aluminum sheets were exposed to mercury lamps as disclosed in part A above. The varnish was found to cure at different rates, depending upon the amount and type of photoinitiator and accelerators present in the acrylic ink. Results and details of the photoinitiator were as follows:

| Acrylic Ink Fraction | Photoinitiator | Cure Speed In Feet Per Minute |
|---|---|---|
| I | 10% diethoxyacetophenone (DEAP) | 300 |
| II | 10% DEAP + 0.2% Michler's Ketone | 100 |
| III | 10% benzophenone + 1% diethanolamine + 0.2% Michler's Ketone | 25 |

EXAMPLE 2

A. Each of a blue acrylic ink (M&T Chemical's Blue 65-59-Al) containing about 20% phthalocyanine blue pigment and a yellow acrylic ink (M&T Chemical's Yellow 65-59-Bl), both prepared from the same acrylic vehicle and devoid of amine accelerator, was applied to paperboard by a proofpress. An epoxy varnish was immediately applied to the wet ink and cured by exposure to three 200-watt-per inch lamps. The varnish cured to a hard finish at a conveyor speed of 200 feet per minute. Varnish applied to unprinted paperboard directly cured at the same speed.

Examination of the cured substrate after it emerges from the radiation zone revealed it to be hardened and sufficiently cured to the extent that it can be stacked or rolled without offset. However, if broken by a strong force, the ink layer beneath is still wet. Examination of the same substrate after about 60 minutes revealed that both the varnish and ink layers are abrasion resistant and are fully cured.

When the above experiment was repeated but substituting acrylic varnish for the epoxy varnish, comparable results were obtained in terms of cure rate. The acrylic varnish was found to be more volatile, however, undergoing a greater weight loss during exposure and during the post-bake.

EXAMPLE 3

Several amine free acrylic inks: M&T Chemical Gold HX1599, Blue HX1597, Red HX1598 and White HX1596, were applied to aluminum two-piece cans. The wet inks were then varnished with an epoxy varnish comprising 70 parts CY179, 24 parts RD-2, 0.5 parts fluorocarbon flow control agent, 0.5 parts of acetylated lanolin alocohol (Acetulan), 5 parts of ethanol and 3 parts of p-methoxybenzenediazonium hexafluorophosphate. The thus decorated cans were cured by twice passing rotating cans on a conveyor under two Hanovia 12" lamps. The properties of the coating were evaluated and rated as follows: pasteurization in a borax solution showed the coating to have excellent Scotch tape adhesion. After boiling for five minutes in boiling water, the coating was judged satisfactory. Pasteurization resistance was also evaluated using a procedure wherein chlorine was introduced into a hot water bath (65° C.) for five minutes after which the decorated cans were immersed for 20 minutes, rinsed, dried, scribed with a stylus and scotch tape adhesion evaluated. The varnished, printed cans showed excellent adhesion to the substrate aluminum. Volatility tests made on the epoxy-acrylic ink film indicated a total weight loss of less than 2% after curing and postbaking. Comparable values with acrylic varnish-acrylic inks were found to be in the range of 14 to 25% or higher.

When the above experiment was repeated but substituting diphenyl iodonium hexafluorophosphate, triphenyl carbethoxy methyl phosphonium tetrafluoroborate, triphenylsulfonium fluoroborate, bis(perfluoromethylsulfonyl) methane phenyl diazonium salt or bis(perfluoromethylsulfonyl) methane silver salt, comparable results are obtained.

It will be seen from the above description that the present invention provides a method that is particularly effective for decorating metal containers and other substrates while conveying the additional advantages of employing a non-polluting energy saving system.

It is understood that the foregoing detailed description is given merely by way of illustration and that many variations can be made therin without departing from the spirit of the invention.

We claim:

1. A method for producing a multilayer coating which comprises:
    (1). applying as a first layer to a substrate a radiation-curable ink composition comprising at least one ethylenically unsaturated material polymerizable to higher molecular weight and a photosensitizer which releases an active catalyst effective to initiate curing of said material upon exposure to radiation:
    (2). without drying or actively effecting curing of said first layer, applying to said first layer a radiation-curable varnish composition comprising at least one epoxide material polymerizable to higher molecular weight and a photosensitizer which initiates curing of said material upon exposure to radiation; said first layer composition being devoid of components that act to substantially inhibit or retard the action of the catalyst precursor in said second layer; and (3). exposing the coated substrate to irradiation to produce a hardened multilayered coated substrate.

2. A method as defined in claim 1 in which said first layer composition comprises an amine-free acrylic ink.

3. A method as defined in claim 2 in which said amine-free acrylic ink contains diethoxyacetophenone as the photosensitizer.

4. A method as defined in claim 1 in which said second layer composition comprises an epoxy varnish containing a bis(epoxycyloalkyl) ester.

5. A method as defined in claim 4 in which said epoxy varnish comprises radiation-sensitive material which decomposes, upon exposure to radiation, to release a Lewis Acid effective to initiate polymerization of the epoxide material.

6. A method as defined in claim 5 in which said material is an onium salt of a complex halogenide.

7. A method as defined in claim 6 in which said onium salt is an aromatic diazonium, iodonium or sulfonium salt of a complex halogenide.

8. A method as defined in claim 4 in which said epoxy varnish comprises a bis(perfluoroalkyl sulfonyl) methane salt as the photosensitizer.

9. A method as defined in claim 1 in which said substrate is metal, paper, glass or plastic.

10. A method as defined in claim 9 in which said substrate is a metal container.

11. A method for producing a printed and varnished substrate which comprises:
(1). applying to a substrate a fluid, essentially solventless radiation-curable acrylic ink composition comprising at least one polymerizable material having ethylenic unsaturation and diethoxyacetophenone as a photosensitizer effective to initiate polymerization of said material upon exposure to radiation;
(2). applying to the wet ink a fluid, essentially solventless epoxy varnish comprising at least one polymerizable epoxide material and, as a photosensitizer effective to initiate polymerization of said epoxide material, an onium salt of a complex halogenide which decomposes to release a Lewis Acid upon exposure to radiation; said acrylic ink being devoid of components that substantially inhibit or retard the action of the photosensitizer in the epoxy varnish;
(3). exposing the printed, varnished substrate to irradiation to produce a hardened, abrasion-resistant printed and varnished substrate.

12. A method as defined in claim 11 in which said acrylic ink comprises a resin ester derived from the reaction of o-benzoyl benzoic acid and epoxidized linseed oil, an acrylated epoxy resin, pentaerythritol triacrylate, diethoxyacetophenone and a pigment.

13. A method as defined in claim 11 in which said epoxy varnish comprises a bis(epoxycycloalkyl) ester, a monoepoxide diluent and a diazonium salt of a complex halogenide.

14. A method as defined in claim 13 in which said substrate is a metal container.

15. A method for producing a printed and varnished substrate which comprises:
(1). applying to the substrate a fluid, essentially solventless radiation-curable epoxy ink composition comprising at least one polymerizable liquid epoxide material and a photoinitiator effective to initiate polymerization of said material upon exposure to radiation;
(2). applying to the wet ink a fluid, essentially solventless radiation-curable acrylic varnish composition comprising at least one polymerizable material having ethylenic unsaturation and a photosensitizer effective to initiate polymerization of said material upon exposure to radiation; said acrylic varnish being devoid of components that act to substantially inhibit or retard the action of the photosensitizer in said epoxy ink layer; and
(3). exposing the coated substrate to irradiation to produce a hardened, printed and varnished substrate.

* * * * *